United States Patent
Manning

(10) Patent No.: US 8,725,927 B2
(45) Date of Patent: May 13, 2014

(54) HOT MEMORY BLOCK TABLE IN A SOLID STATE STORAGE DEVICE

(75) Inventor: Troy Manning, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 727 days.

(21) Appl. No.: 12/251,640

(22) Filed: Oct. 15, 2008

(65) Prior Publication Data

US 2010/0095049 A1    Apr. 15, 2010

(51) Int. Cl.
*G06F 12/10* (2006.01)
*G06F 12/08* (2006.01)

(52) U.S. Cl.
CPC ........ *G06F 12/0868* (2013.01); *G06F 12/1027* (2013.01); *G06F 2212/1016* (2013.01); *G06F 2212/7201* (2013.01)
USPC .......................................... 711/103; 711/133

(58) Field of Classification Search
USPC .................................. 711/103, 133
See application file for complete search history.

(56) References Cited

U.S. PATENT DOCUMENTS

| | | | | |
|---|---|---|---|---|
| 6,408,371 | B1* | 6/2002 | Jeddeloh | 711/170 |
| 7,472,226 | B1* | 12/2008 | Emma et al. | 711/128 |
| 2001/0012222 | A1 | 8/2001 | Terasaki | |
| 2005/0080986 | A1* | 4/2005 | Park | 711/103 |
| 2005/0158085 | A1* | 7/2005 | Murakami et al. | 399/299 |
| 2006/0265557 | A1* | 11/2006 | Peinado et al. | 711/154 |
| 2006/0285397 | A1 | 12/2006 | Nishihara et al. | |
| 2007/0050548 | A1 | 3/2007 | Bali et al. | |
| 2007/0124531 | A1* | 5/2007 | Nishihara | 711/3 |
| 2008/0005522 | A1* | 1/2008 | Paladini et al. | 711/170 |
| 2008/0082729 | A1 | 4/2008 | Moon et al. | |
| 2008/0140897 | A1* | 6/2008 | Ganguly | 710/268 |
| 2008/0168253 | A1* | 7/2008 | Garrison | 711/202 |
| 2008/0189495 | A1* | 8/2008 | McBrearty et al. | 711/160 |
| 2009/0049272 | A1* | 2/2009 | Brunheroto et al. | 711/207 |
| 2009/0113135 | A1* | 4/2009 | Cain et al. | 711/135 |
| 2009/0158085 | A1* | 6/2009 | Kern et al. | 714/6 |

FOREIGN PATENT DOCUMENTS

JP    2001-142774    5/2001

OTHER PUBLICATIONS

Andrew S. Tanenbaum, Modern Operating Systems, 2001, Prentice-Hall, Inc., Second Edition, pp. 218-219.*
TechTerms.com, Cache, [online] [url=http://www.techterms.com/definition/cache].*

* cited by examiner

*Primary Examiner* — Jared Rutz
(74) *Attorney, Agent, or Firm* — Leffert Jay & Polglaze, P.A.

(57) ABSTRACT

Solid state storage devices and methods for populating a hot memory block look-up table (HBLT) are disclosed. In one such method, an indication to an accessed page table or memory map of a non-volatile memory block is stored in the HBLT. If the page table or memory map is already present in the HBLT, the priority location of the page table or memory map is increased to the next priority location. If the page table or memory map is not already stored in the HBLT, the page table or memory map is stored in the HBLT at some priority location, such as the mid-point, and the priority location is incremented with each subsequent access to that page table or memory map.

24 Claims, 5 Drawing Sheets

HOT MEMORY BLOCK TABLE IN A SOLID STATE STORAGE DEVICE

TECHNICAL FIELD OF THE INVENTION

The present invention relates generally to memory devices and in a particular embodiment the present invention relates to non-volatile memory devices.

BACKGROUND OF THE INVENTION

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and non-volatile memory (e.g., flash memory).

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Flash memory devices can also be incorporated into solid state storage devices such as solid state drives. A solid state drive is comprised of multiple flash packages where each package can be comprised of many memory dies. Solid state drives are used in computers to replace the hard disk drives that typically have used magnetic or optical disks for storing large amounts of data. A solid state drive does not need to use moving parts whereas a hard disk drive requires a complex and sensitive drive and read/write head assembly to interact with the magnetic/optical disk. Thus, the solid state drives are more resistant to damage and loss of data through vibration and impacts.

A Flash Translation Layer (FTL) in the solid state drive works in conjunction with an operating system to make the solid state drive appear to the operating system as a disk drive. This is accomplished by the FTL creating virtual small blocks of data, also known as sectors, out of flash erase blocks. The FTL also manages and maps data on the solid state drive so that it appears to the system to be written in a certain location when in fact it is being stored, for wear leveling purposes, in different locations throughout the flash memory.

The FTL performs these tasks by generating and maintaining large tables in memory to map host requests to one sector of a disk drive to the actual location of data in the flash memory dies of the solid state drive. These tables can be so large that the system RAM cannot hold them and the flash memory has to be used as overflow memory to hold portions of the tables. Accessing these tables in flash memory can degrade system performance since read and write operations to flash memory require more time than read and write operations to RAM.

For the reasons stated above, and for other reasons stated below that will become apparent to those skilled in the art upon reading and understanding the present specification, there is a need in the art for a more efficient Flash Translation Layer.

DETAILED DESCRIPTION

Figure 1:
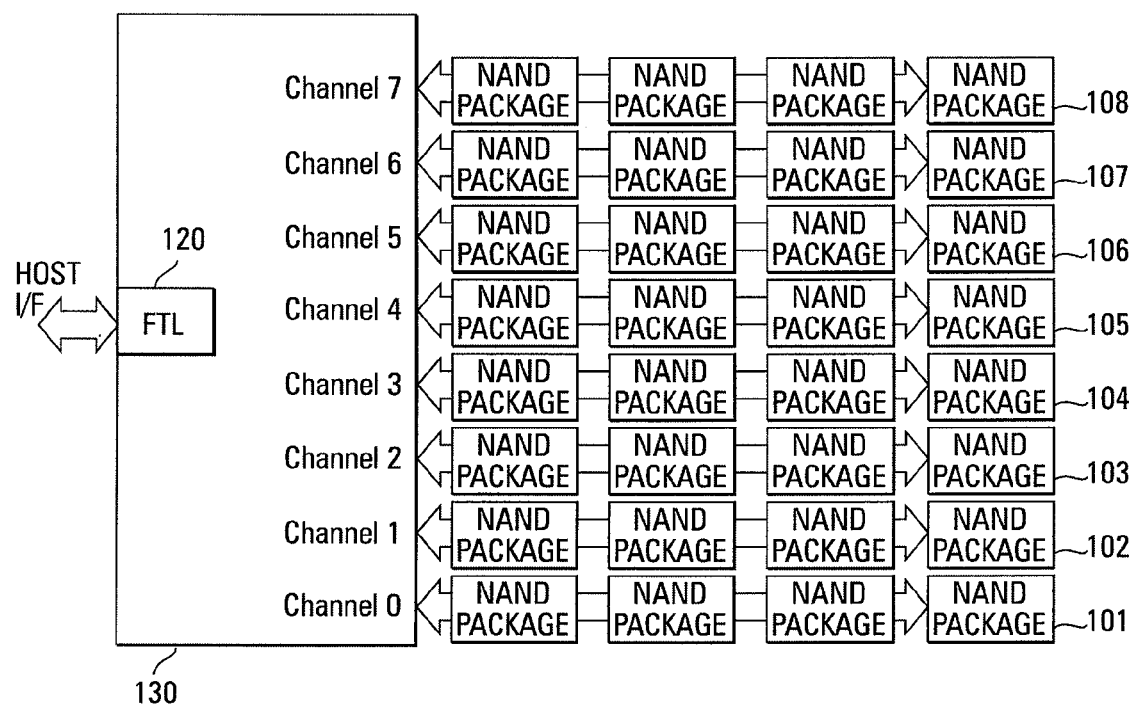
FIG. 1 shows a solid state drive that incorporates a Flash Translation Layer.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a block diagram of one embodiment of a solid state drive that incorporates a Flash Translation Layer (FTL) 120 that uses a hot memory block look-up table. In one embodiment, the hot memory block look-up table is part of the FTL.

The drive of FIG. 1 is comprised of a controller 130, having eight communication channels 101-108, that executes the FTL 120. Each channel 101-108 is connected to four stacked memory packages. These devices are illustrated as NAND memory packages. Alternate embodiments can use other types of solid state memory.

Each stacked NAND memory package, also referred to as a logical unit (LUN), can be accessed in a parallel manner and is subsequently referred to as a parallel unit (PU). Each PU may be assigned a unique number or some other unique identifier. As described subsequently with reference to FIGS. 4 and 5, each PU or other memory unit is assigned its own hot memory block look-up table.

Each logical unit might share the same chip select (CE) signal so that each logical unit is accessed by an address bit to distinguish the multiple dies in the package. The multiple dies may operate in parallel on different commands at the same time. In other words, one die might be experiencing a write operation while another is experiencing a read operation. Each memory die of the package may be assigned to a different plane within the package.

Figure 2:
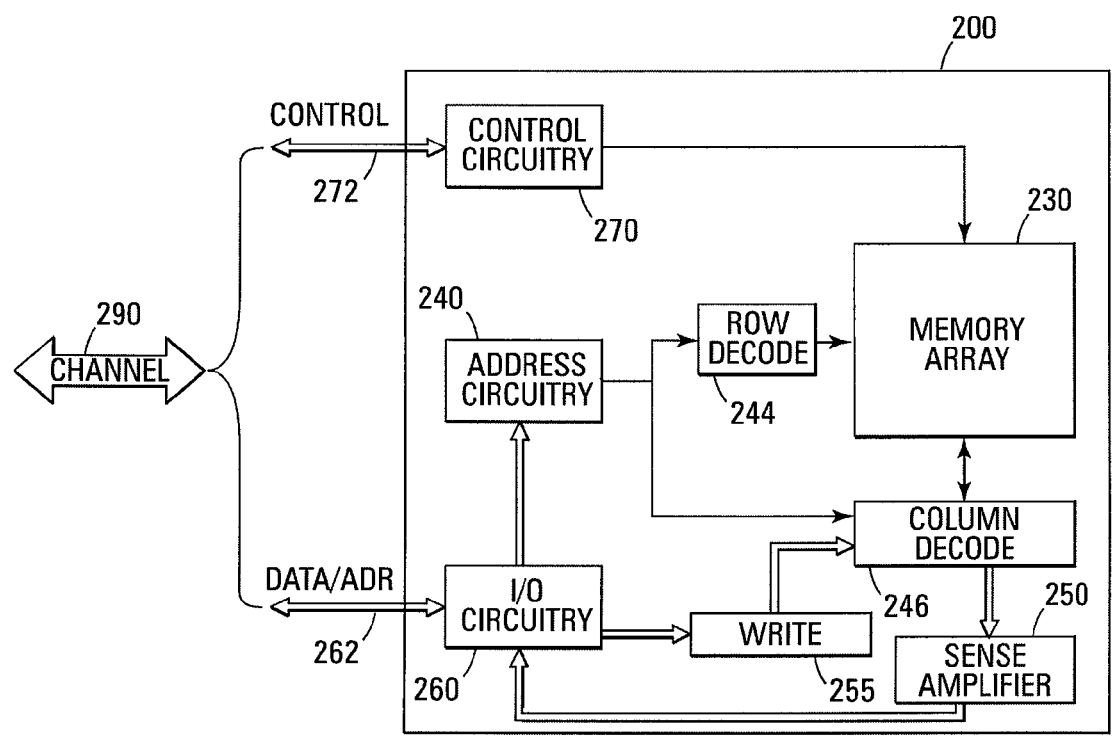
FIG. 2 shows a block diagram of one embodiment of a non-volatile memory device, in accordance with the solid state drive of FIG. 1, that incorporates a flash memory array and a memory communication channel.

FIG. 2 illustrates a functional block diagram of a non-volatile memory device 200 that can be incorporated on an integrated circuit die. The non-volatile memory device 200, in one embodiment, is flash memory.

Figure 3:
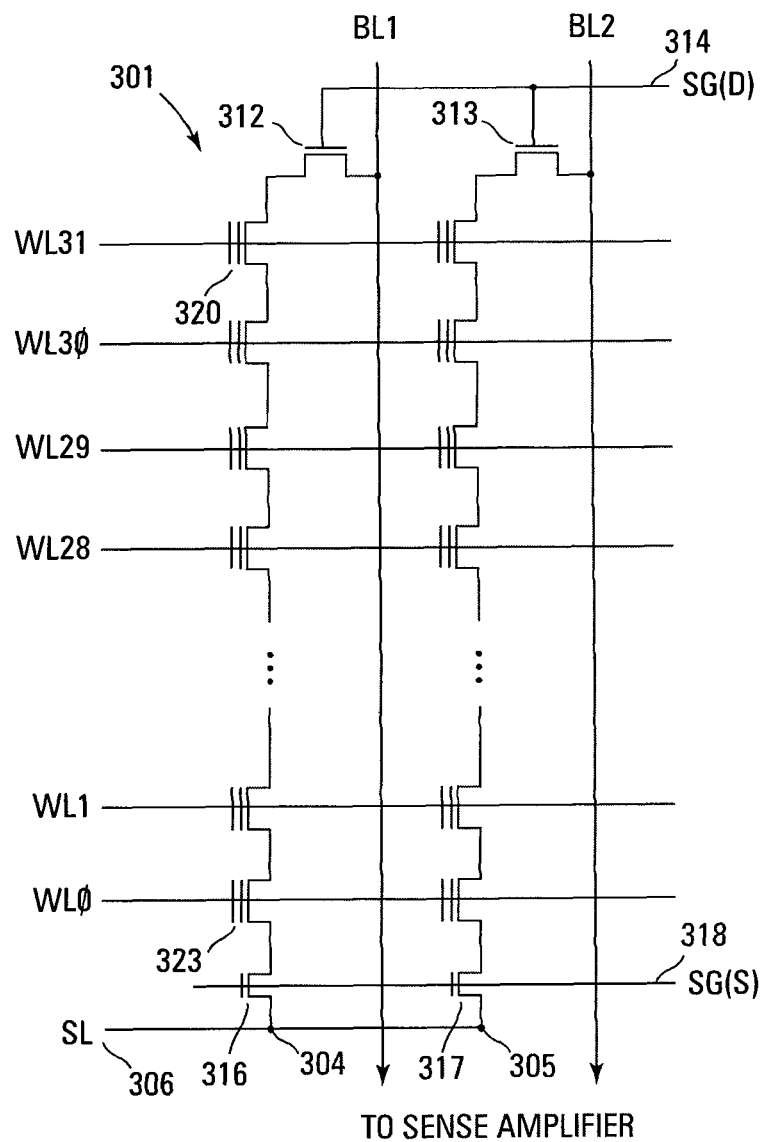
FIG. 3 shows a schematic diagram of one embodiment of a portion of a non-volatile memory array in accordance with the non-volatile memory devices of FIGS. 1 and 2.

The non-volatile memory device 200 includes an array 230 of non-volatile memory cells such as the floating gate memory cells that are illustrated in FIG. 3 and discussed subsequently. The memory array 230 is arranged in banks of access line (e.g., word line) rows and data line (e.g., bit line) columns. In one embodiment, the columns of the memory array 230 are comprised of series strings of memory cells. As is well known in the art, the connections of the cells to the bit lines determines whether the array is a NAND architecture, an AND architecture, or a NOR architecture.

The memory array 230 can be organized into memory blocks. The quantity of memory blocks is typically determined by the size of the memory device (i.e., 512 MB, 1 GB). In one embodiment, each memory block is organized into 64 pages.

Address buffer circuitry 240 is provided to latch address signals provided through the I/O circuitry 260. Address signals are received and decoded by a row decoder 244 and a column decoder 246 to access the memory array 230. It will be appreciated by those skilled in the art, with the benefit of the present description, that the number of address input connections depends on the density and architecture of the memory array 230. That is, the number of addresses increases with both increased memory cell counts and increased bank and block counts. Data is also input and output through the I/O circuitry 260 based on the timing of the control signals 272.

The non-volatile memory device 200 reads data in the memory array 230 by sensing voltage or current changes in the memory array columns using sense amplifier circuitry 250. The sense amplifier circuitry 250, in one embodiment, is coupled to read and latch a row of data from the memory array 230. I/O circuitry 260 is included for bidirectional data communication as well as address communication over a plurality of data connections 262 with an external controller. Write circuitry 255 is provided to write data to the memory array.

The memory control circuitry 270 decodes signals provided on control bus 272 from an external controller. These signals can include read/write (R/$\overline{W}$), chip enable (CE), command latch enable (CLE), address latch enable (ALE) as well as other control signals that are used to control the operations on the memory array 230 as well as other circuitry of the memory device 200. In one embodiment, these signals are active low but alternate embodiments can use active high signals. The memory control circuitry 270 may be a state machine, a sequencer, or some other type of controller to generate the memory control signals.

The non-volatile memory device 200 communicates with an external controller over the communication channel 290, as illustrated in FIG. 1. In one embodiment, the channel 290 is comprised of the memory address, data, and control signals between the solid state drive controller and the memory device 200. The embodiment of FIG. 2 shows the address and data being coupled as one bus to the I/O circuitry 260. In an alternate embodiment, the address and data buses are separate inputs/outputs with the memory device 200.

FIG. 3 illustrates a schematic diagram of a portion of a NAND architecture memory array comprising series strings of non-volatile memory cells. While the subsequent discussions refer to a NAND memory device, the present embodiments are not limited to such an architecture.

The memory array is comprised of an array of non-volatile memory cells 301 (e.g., floating gate) arranged in columns such as series strings 304, 305. Each of the cells 301 is coupled drain to source in each series string 304, 305. A word line WL0-WL31 that spans across multiple series strings 304, 305 is connected to the control gates of each memory cell in a row in order to bias the control gates of the memory cells in the row. Bit lines BL1, BL2 are eventually connected to sense amplifiers (not shown) that detect the state of each cell by sensing current on a particular bit line.

Each series string 304, 305 of memory cells is coupled to a source line 306 by a source select gate 316, 317 and to an individual bit line BL1, BL2 by a drain select gate 312, 313. The source select gates 316, 317 are controlled by a source select gate control line SG(S) 318 coupled to their control gates. The drain select gates 312, 313 are controlled by a drain select gate control line SG(D) 314.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ windows that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Figure 4:
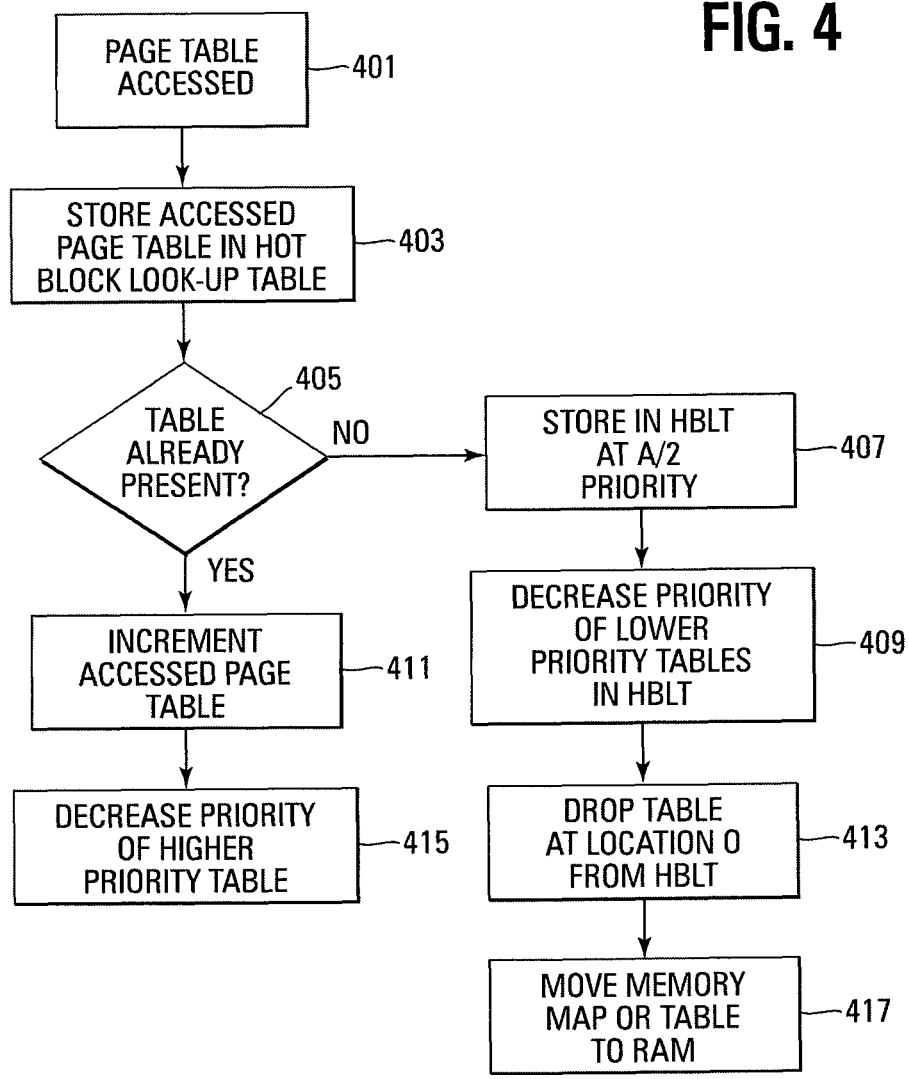
FIG. 4 shows a flowchart of one embodiment of a method for populating a hot memory block look-up table.

FIG. 4 illustrates a flowchart of one embodiment of a method for populating a hot memory block look-up table for a solid state memory device, such as the solid state drive of FIG. 1. The table is used to track which memory blocks of an associated parallel unit are considered "hot" (i.e., used more often than other blocks). The "hot" portions of the memory map that the FTL uses for mapping a received disk drive sector to a memory erase block are moved into RAM from an over-flow area in non-volatile memory. This enables the maps that are used more often to be accessed more rapidly from the higher speed RAM than from the slower speed flash memory.

A page table or memory map of a flash memory block containing the location of sectors (e.g., logical block addresses) of data to be translated by the FTL is initially accessed 401 by the FTL. A pointer to this particular page table is then stored in the hot memory block look-up table 403. It is assumed for subsequent discussion that the hot memory block look-up table is comprised of a quantity of "A" entries from 0 to A where A is the table with the highest priority and 0 is the table with the lowest priority.

If the accessed table is not already present in the hot memory block look-up table 405, it is stored in the hot memory block look-up table with an initial priority of A/2 407. Alternate embodiments may store the accessed table with some other initial priority than A/2. The tables that are already stored in the hot memory block look-up table with a lower priority than A/2 are then decreased in priority 409. The table that was at priority 0 is then dropped from the hot memory block look-up table 413. Using the present method, the hot memory block look-up table is constantly being updated with higher priority tables/maps while the lower priority tables/maps are dropped and the corresponding map/page table is moved out of the higher speed RAM area. The page table or memory map of the flash memory block containing the location of sectors of data to be translated by the FTL are moved from an overflow area in slower non-volatile memory to the faster RAM 417.

If the accessed table is already present in the hot memory block look-up table 405, the priority of this table is incremented 411. When the accessed table is moved up in priority, the lowest priority table above A/2 is then moved down 415. For example, if the accessed table was at priority A/2 and it was accessed a second time, it would now be at priority location A/2+1 and the table that had previously occupied the A/2+1 location would then be decreased in priority to location A/2. This would continue until the accessed table is at location A, the highest priority location of the hot memory block look-up table. Since, in this case, no new tables have been added, there is not a need to drop the previous priority location 0 table since it remains at location 0.

Figure 5:
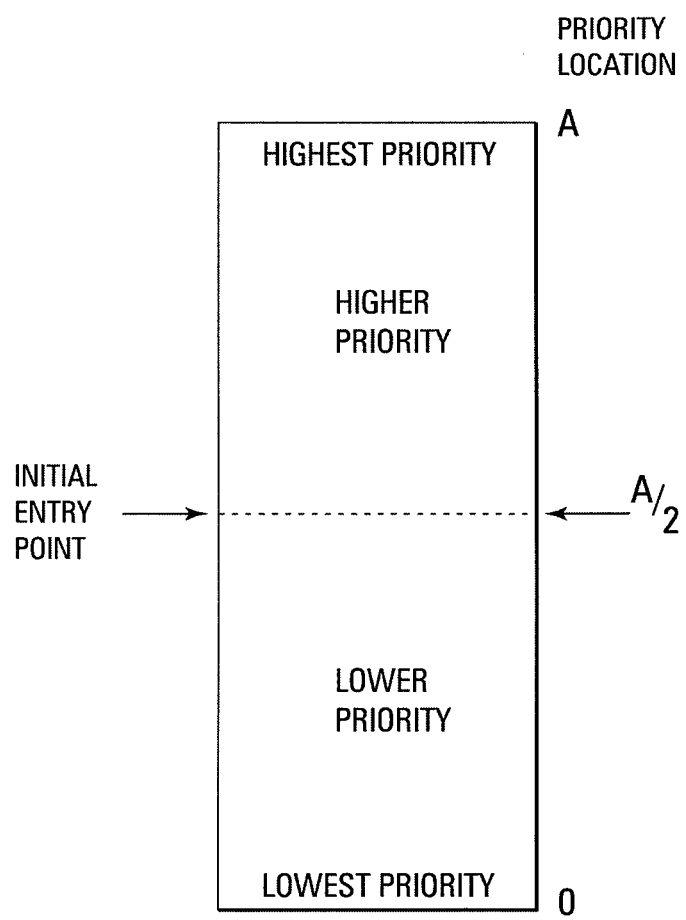
FIG. 5 shows one embodiment of a hot memory block look-up table in accordance with the populating method of FIG. 4.

FIG. 5 illustrates one embodiment of a hot memory block look-up table as generated by the method of FIG. 4. Each entry of the hot memory block look-up table comprises a page table or memory map pointer to a flash memory block in an associated parallel unit or other memory unit. The entries are ordered from the lowest priority at the 0 priority location to the highest priority at the A priority location. As previously described, the initial entry point is the mid point (i.e., A/2) priority location of the table.

CONCLUSION

In summary, one or more embodiments of the hot block look-up table for a solid state memory device provide quicker access to page tables or memory maps of a NAND flash memory block in a parallel unit associated with the hot memory block look-up table. An initially accessed memory map is entered into the table at the mid-point of A/2 and is moved up the table priority locations each time it is accessed. The portion of the map that is pointed to by the look-up table entry is moved from the lower speed non-volatile memory to the higher speed RAM.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for populating a hot memory block look-up table having a plurality of locations from a highest priority location to a lowest priority location, the method comprising:
   determining when a page table, of a plurality of page tables, is accessed, wherein each page table of the plurality of page tables contains a plurality of logical block addresses of data to be translated by a translation layer;
   if an indication of the accessed page table is already in the hot memory block look-up table at a first priority location, increasing the first priority location to a second priority location having a higher priority than the first priority location;
   if the indication of the accessed page table is not in the hot memory block look-up table, storing the indication in the hot memory block look-up table at an initial priority location and removing, from the lowest priority location of the hot memory block look-up table, an indication of a lowest priority page table; and
   moving the accessed page table from a non-volatile memory to a volatile memory in response to the accessed page table being accessed more often than other page tables of the plurality of page tables.

2. The method of claim 1 wherein the initial priority location is A/2 where A is a highest priority location in the hot memory block look-up table.

3. The method of claim 2 wherein the hot memory block look-up table is comprised of priority locations from a lowest priority location of 0 to the highest priority location of A.

4. The method of claim 1 wherein the indication of the accessed page table is a pointer to the accessed page table.

5. The method of claim 1 wherein the hot memory block look-up table is part of the flash translation layer.

6. The method of claim 1 wherein the hot memory block look-up table is executed by the flash translation layer.

7. A method for populating a hot memory block look-up table, having a plurality of locations from a highest priority location to a lowest priority location, in a solid state drive, the method comprising:
   determining when a page table, of a plurality of page tables, is accessed, wherein each page table of the plurality of page tables contains a plurality of logical block addresses of data to be translated by a translation layer;
   determining if the accessed page table is present at a priority location in the hot memory block look-up table;
   if the accessed page table is present in the hot memory block look-up table, increasing the priority location of the accessed page table and decreasing a priority location of a page table having a higher priority location than the accessed page table;
   if the page table is not present in the hot memory block look-up table, storing an indication of the page table in the hot memory block look-up table at a mid-point priority location of the hot memory block look-up table and removing an indication of a page table from the lowest priority location of the hot memory block look-up table; and
   moving the accessed page table to a memory location having a faster access time from a memory location having a slower access time in response to the accessed page table being accessed more often than other page tables of the plurality of page tables.

8. The method of claim 7 wherein the solid state drive comprises a plurality of parallel units and a hot memory block look-up table associated with each parallel unit.

9. The method of claim 7 wherein increasing the priority location of the accessed page table includes incrementing the priority location of the accessed page table by one priority location and decrementing by one priority location the priority location of the page table having the higher priority location.

10. The method of claim 7 and further including:
    if the page table is not present in the hot memory block look-up table, decreasing a priority location of page table indications having a priority location in the hot memory block look-up table that are less than the mid-point priority location.

11. The method of claim 7 and further comprising moving the accessed page table from a non-volatile memory location to a RAM location.

12. A method for populating a hot memory block look-up table, having a plurality of locations from a highest priority location to a lowest priority location, in a solid state memory device, the method comprising:
    if a page table, of a plurality of page tables, is accessed, storing the accessed page table at a priority location in the hot memory block look-up table, wherein each page table of the plurality of page tables contains a plurality of logical block addresses of data to be translated by a translation layer;
    increasing the priority location of the accessed page table in the hot memory look-up table for each subsequent access to the page table;
    removing an entry from the lowest priority location of the hot memory block look-up table for each new entry stored in the hot memory block look-up table; and
    moving the accessed page table from an over-flow area in non-volatile memory to a volatile memory in response to the accessed page table being accessed more often than other page tables of the plurality of page tables.

13. The method of claim 12 wherein storing the accessed page table at the priority location comprises storing the accessed page table at a mid-point priority location.

14. The method of claim 12 and further including decreasing a priority location for each hot memory block look-up table entry below a mid-point priority location for each new entry to the hot memory block look-up table.

15. A solid state memory device comprising:
a plurality of memory arrays; and
a controller coupled to the plurality of memory arrays over at least one communication channel, the controller configured to track access operations to a memory map for each of the plurality of memory arrays wherein, when a memory map is accessed, an indication of the accessed memory map is stored in a hot memory block look-up table having a highest priority location and a lowest priority location if the indication is not already at a priority location in the hot memory block look-up table and remove an indication from the lowest priority location of the hot memory block look-up table with a newly stored indication, and the controller is further configured to increase the priority location of the accessed memory map if the indication is already in the hot memory block look-up table, the controller is further configured to move the accessed memory map from an over-flow area in non-volatile memory to a volatile memory in response to the accessed memory map being accessed more often than other memory maps of a plurality of memory maps, wherein the accessed memory map contains a plurality of logical block addresses of data to be translated by a translation layer.

16. The device of claim 15 wherein the controller is further configured to store the indication at a priority location of A/2 in the hot memory block look-up table when the indication is not already stored in the hot memory block look-up table wherein A is a highest priority and 0 is a lowest priority of the hot memory block look-up table.

17. The device of claim 15 wherein the plurality of memory arrays are configured in a NAND architecture.

18. The device of claim 15 wherein the controller is further configured to execute the flash translation layer that translates a received disk drive sector indicator to a memory map location.

19. The device of claim 15 wherein the look-up table tracks which memory blocks of an associated memory array are used more often than other blocks.

20. A method for populating a hot memory block look-up table having a plurality of locations from a highest priority location to a lowest priority location, the method comprising:

determining if at least a portion of a memory map, of a plurality of memory maps, is accessed, wherein each memory map of the plurality of memory maps contains a plurality of logical block addresses of data to be translated by a translation layer;
if an indication of the accessed portion of the memory map is already in the hot memory block look-up table at a first priority, increasing the first priority to a second priority having a higher priority than the first priority;
if the indication of the accessed portion of the memory map is not in the hot memory block look-up table, storing the indication in the hot memory block look-up table at an initial priority and removing a lowest priority indication from the hot memory block look-up table; and
moving the accessed memory map to a memory location having a faster access time from a memory location having a slower access time in response to the accessed memory map being accessed more often than other memory maps of the plurality of memory maps.

21. The method of claim 20 wherein the initial priority is at a mid-point of all locations in the hot memory block look-up table.

22. The method of claim 20 wherein the initial priority is at a location other than a mid-point of all locations in the hot memory block look-up table.

23. A method for populating a hot memory block look-up table, having a plurality of locations from a highest priority location to a lowest priority location, in a solid state drive, the method comprising:
if at least a portion of a memory map, of a plurality of memory maps, is accessed, storing the portion of the memory map at a priority location in the hot memory block look-up table and removing a priority memory map from the lowest priority location of the hot memory block look-up table, wherein each memory map of the plurality of me mm maps contains a plurality of logical block addresses of data to be translated by a translation layer;
increasing the priority location towards a highest priority location in the hot memory look-up table for each subsequent access to the portion of the memory map; and
moving the accessed memory map to a memory location having a faster access time from a memory location having a slower access time in response to the accessed memory map being accessed more often than other memory maps of the plurality of memory maps.

24. The method of claim 23 wherein each parallel unit, of a plurality of parallel units, in the solid state drive is assigned a different hot memory block look-up table.

* * * * *